INVENTOR.
FORREST A. NELSON
BY
ATTORNEY

March 18, 1969  F. A. NELSON  3,434,043
NUCLEAR MAGNETIC RESONANCE PROBE APPARATUS HAVING DOUBLE TUNED
COIL SYSTEMS FOR SPECTROMETERS EMPLOYING
AN INTERNAL REFERENCE
Filed Feb. 14, 1966  Sheet 2 of 2
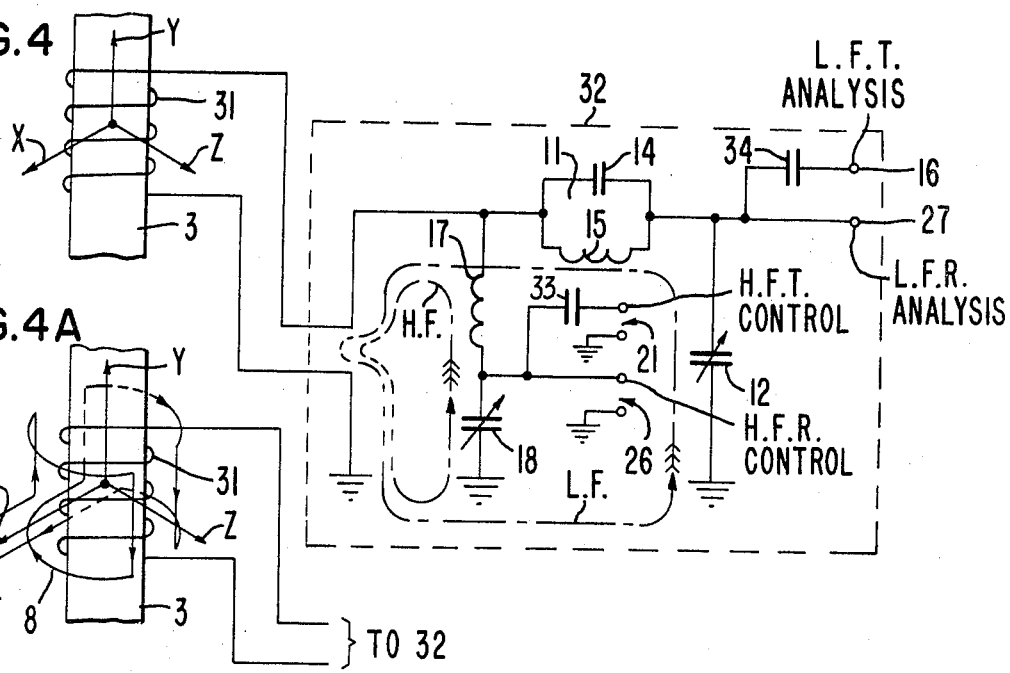
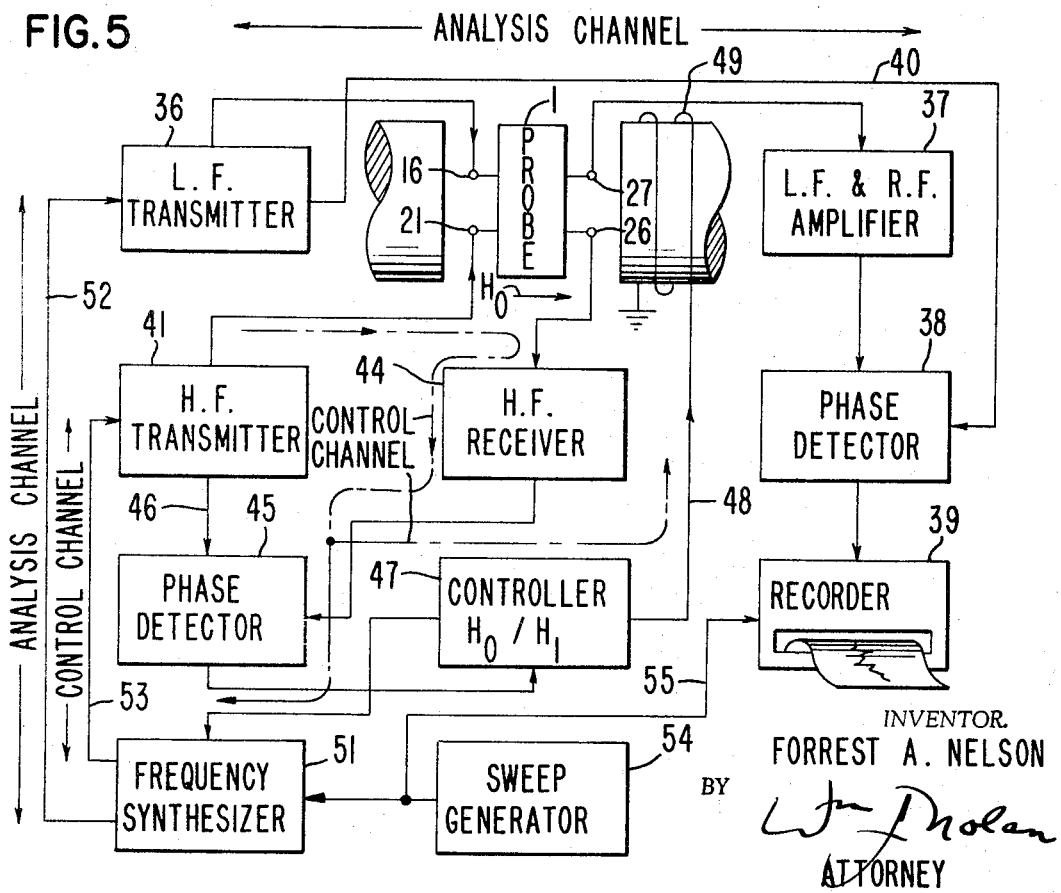
INVENTOR.
FORREST A. NELSON
BY
ATTORNEY United States Patent Office 3,434,043
Patented Mar. 18, 1969

3,434,043
NUCLEAR MAGNETIC RESONANCE PROBE
APPARATUS HAVING DOUBLE TUNED
COIL SYSTEMS FOR SPECTROMETERS
EMPLOYING AN INTERNAL REFERENCE
Forrest A. Nelson, Palo Alto Calif., assignor to
Varian Associates, Palo Alto, Calif., a corporation of California
Filed Feb. 14, 1966, Ser. No. 527,311
U.S. Cl. 324—.5                          5 Claims
Int. Cl. H01s 1/00; G01n 27/00; G01r 33/08

ABSTRACT OF THE DISCLOSURE

A nuclear magnetic resonance spectrometer is disclosed. The spectrometer includes a probe structure for immersing a control group and a sample group of nuclear resonant bodies in a polarizing magnetic field. The spectrometer includes a control channel for exciting and detecting nuclear resonance of the control group to derive a control signal for controlling the resonance conditions of the spectrometer. The spectrometer also includes an analysis channel including means for exciting nuclear resonance of the sample group of nuclei at a lower resonant frequency than that of the control group to derive a resonance signal for analysis of the sample. A coil structure is common to both the control and analysis channels for providing coupling of radio frequency magnetic A.C. fields, at the substantially different resonant frequencies of the groups, between the control and sample groups of nuclei and the control and analysis channels of the spectrometer. The analysis channel includes an analysis loop portion tuned to the lower resonant frequency of the sample, whereas the control channel includes a control loop portion connected in shunt across the analysis loop portion with the control loop portion being tuned to the resonant frequency of the control group which is higher than the resonant frequency of the analysis loop portion. The analysis loop portion includes a tuned trap external of the control loop portion with the trap being tuned to the frequency of the tuned control loop for separating the control signals into the control loop portion and the analysis signals into the analysis loop portion.

---

Figure 1:
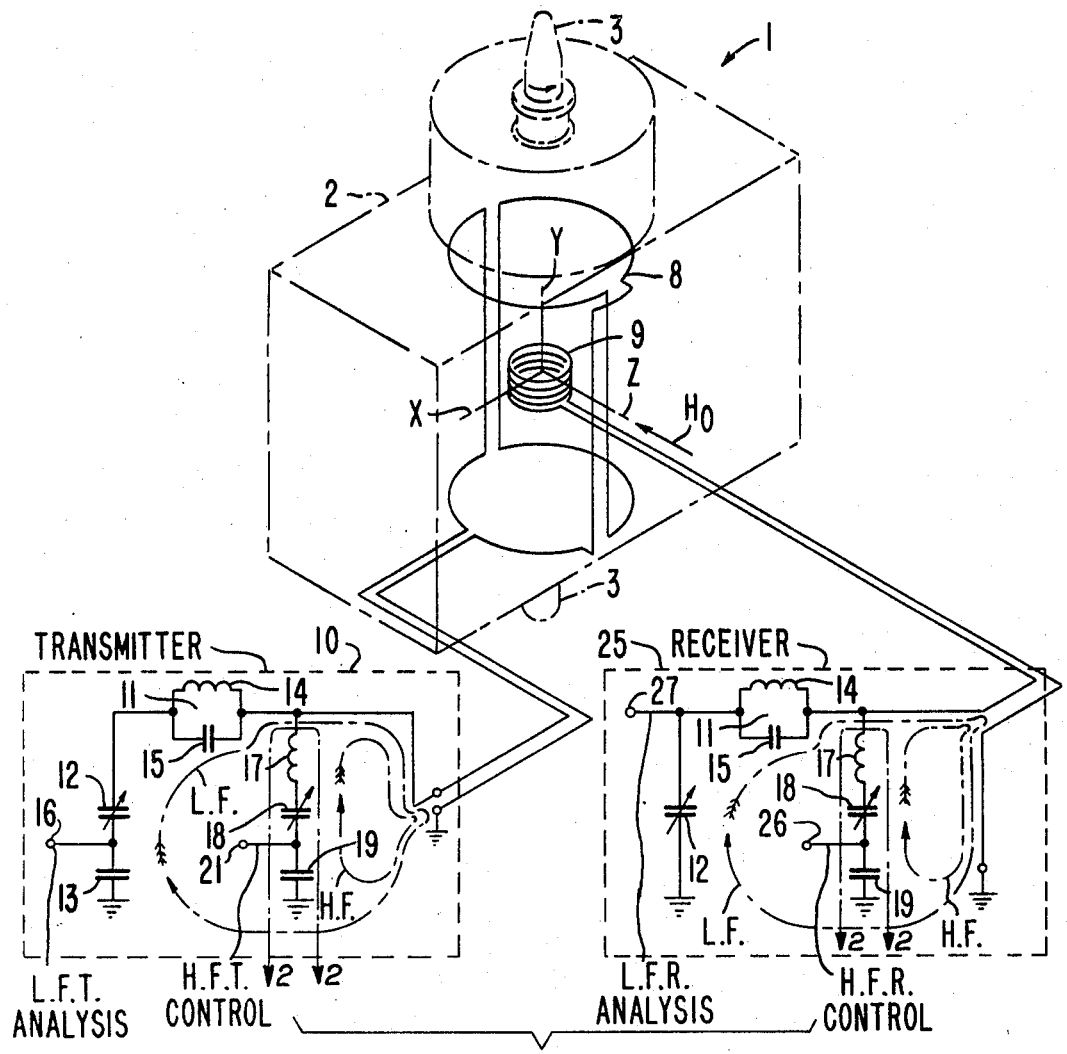

Heretofore it has been proposed, in a nuclear magnetic resonance spectrometer employing an internal control group of nuclei, to use common coil structure for both the analysis and control channels of the spectrometer. Such a spectrometer is described and claimed in U.S. Patent 3,085,195, titled "Gyromagnetic Resonance Methods and Apparatus," issued Apr. 9. 1963, and assigned to the same assignee as the present invention. In this prior spectrometer it was contemplated that the crossed coil system of the probe would be a single tuned circuit having sufficient bandwidth to pass signals at the resonant frequencies of both the control and sample nuclei, such as for example $F^{19}$ control nuclei and $H^1$ sample nuclei at, for example, 56 mHz. and 60 mHz., respectively. While such a system has sufficient sensitivity for detecting resonance of $F^{19}$ and $H^1$ nuclei, greater sensitivity is desired for observing resonance of $C^{13}$ or $N^{15}$ sample nuclei at, for example, frequencies of 15 mHz. and 6 mHz., respectively, while using a strong $F^{19}$ or $H^1$ control groups of nuclei for the control channel at 56 mHz. or 60 mHz., respectively.

In the present invention, a coil of the probe used to excite and/or detect nuclear resonance of the different sample and control nuclei at substantially different frequencies, and which coil is common to both the analysis and control channels of the spectrometer, forms a portion of a double tuned circuit tuned to the two different resonant frequencies of the sample and control groups of nuclei, respectively. In a preferred embodiment of the present invention the probe includes a crossed coil set of separate transmitter and receiver coils which separate coils are each part of their own separate double tuned transmitter or receiver circuits, whereby sensitivity of the spectrometer for the sample group of nuclei is optimized. In another embodiment of the present invention the common coil of the probe comprises a single combined transmitter and receiver coil structure which forms part of a double tuned combined transmitter and receiver circuit, whereby the probe structure is simplified to facilitate manufacture at some slight sacrifice in sensitivity of the sample analysis channel of the spectrometer. A third embodiment has a transmitter coil of a crossed coil set coupled to the spectrometer transmitter, and the second coil forms the common coil double tuned to couple to the spectrometer receiver, at one frequency, and also to the combined transmitter and receiver of a control system, at another frequency. An advantage of the present invention is that both the single and double coil embodiments utilize conventional double and single coil probe structure. In addition the double tuned circuitry can be placed externally of the probe in a separate box of circuitry which is connected to the conventional probe. Thus many spectrometers now in use may be readily modified, in the field, to take advantage of the improved sensitivity and stability offered by the use of an internal control group of nuclei according to the teachings of the present invention.

The principal object of the present invention is the provision of an improved nuclear magnetic resonance spectrometer.

One feature of the present invention is the provision of a coil structure common to both a sample analysis channel and a control channel of the spectrometer for exciting and detecting nuclear magnetic resonance of a sample and wherein the common coil structure forms a portion a double tuned circuit tuned for resonance at the substantially different frequencies of the sample nuclei under observation and its control group of nuclei, whereby the sensitivity of the spectrometer is improved.

Another feature of the present invention is the same as the preceding wherein the common coil structure includes separate transmitter and receiver coils each coil forming part of a pair of separate double tuned transmitter and receiver circuits, whereby sensitivity of the spectrometer is optimized.

Another feature is the same as the first feature wherein the common coil structure includes a single combined transmitter and receiver coil forming part of a double tuned circuit, whereby the probe structure is simplified.

Another feature of the present invention is the same as the preceding feature wherein the common coil is also the receiver coil of a crossed coil system having a separate transmitter coil for the analysis channel.

Another feature of the present invention is the same as any one or more of the preceding features wherein one of the different frequencies of the double tuned circuit corresponds to the nuclear resonance sample frequencies selected from the class of $C^{13}$ and $N^{15}$ and the other frequency corresponds to the nuclear control resonant frequency of nuclei selected from the class of $F^{19}$ and $H^1$.

Other features and advantages of the present invention will become apparent upon a perusal of the following specification taken in connection with the accompanying drawings wherein:

FIG. 1 is a schematic circuit diagram of the probe coils of the double tuned control and analysis circuit channels of a nuclear magnetic resonance spectrometer employing features of the present invention.

Figure 2:
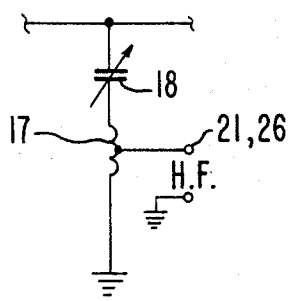
Figure 3:
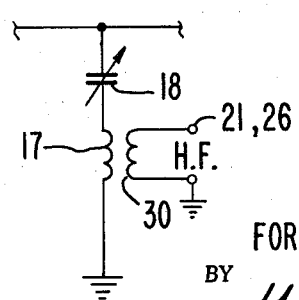

FIGS. 2 and 3 are alternative circuit diagrams of portions of the circuit of FIG. 1 delineated by line 2—2, FIGS. 4 and 4a are alternative embodiments of the circuit of FIG. 1, and FIG. 5 is a block circuit diagram of a nuclear resonance spectrometer employing features of the present invention.

Referring now to FIG. 1 there is shown a circuit diagram for a crossed coil probe structure 1 using a common radio frequency coil structure for both the control and analysis channels of a nuclear magnetic resonance spectrometer.

The probe 1 includes a rectangular metallic block body 2, as of aluminum, indicated by phantom lines 2. The probe body 2 is hollowed out to receive a hollow cylindrical sample container or vial 3 as of Pyrex. The vial 3 is coaxially inserted within a plurality of nested coaxial hollow cylindrical dielectric coil forms, not shown, as of 1 mm. wall thickness Pyrex. An air turbine, not shown, is coupled to the vial 3 for spinning it about its longitudinal axis, as indicated by the arrow, at a high speed as of 3000 r.p.m. to average out certain magnetic field gradients over the sample volume.

A sample of matter to be investigated and containing nuclei of a first kind as of for example $C^{13}$ or $N^{15}$ is inserted within the vial 3. Also a reference or control sample of matter containing nuclei of a second kind and preferably characterized by a relatively strong nuclear magnetic resonance line such as the protons ($H^1$) of tetramethylsilane or a single $F^{19}$ resonance is provided internally of the vial 3 thus providing an internal reference or control group of nuclei. The reference sample provides a strong magnetic resonance line for controlling the magnetic resonance conditions such as frequency, magnetic field intensity or polarizing field homogeneity in the conventional manner as shown and described in U.S. Patent 3,085,195 and U.S. application Ser. No. 372,626 filed June 4, 1964 and assigned to the same assignee as the present invention.

The internal reference sample may be conveniently intermixed with the sample under analysis in some cases and in other cases the vial 3 may be partitioned into concentric compartments for separately containing the two samples of matter. As used herein "internal reference" means that detected resonance of the control group and of the sample or analysis group is obtained from common or nearly common regions of space, as for example, adjacent regions of space. In this manner both groups are subjected to the same resonance conditions of R.F. magnetic field and polarizing magnetic field such that the reference group actually senses and controls the actual resonance conditions over the sample under analysis or investigation.

The probe contains a common crossed coil system for exciting and detecting nuclear magnetic resonance of both the control and analysis groups of nuclei contained within the sample vial 3. The crossed coil system comprises a transmitter coil 8 and a receiver coil 9. The axes of coils 8 and 9, X and Y axes, respectively, are preferably at right angles to the direction of the applied D.C. polarizing magnetic field $H_o$, Z axis. While tre transmitter coil 8 is shown having an axis at right angles to the axis of the receiver coil 9 these two axes may be parallel and at right angles to the polarizing field $H_o$.

The transmitter coil 8 is of conventional geometry having a pair of rectangular coil segments series connected in magnetic field aiding relation. Each coil segment has, for example, 6 turns of insulated wire held to and curving with outside cylindrical surface of the outer coil form, not shown, via epoxy cement. For analysis of $N^{15}$ nuclei at 6 mHz. the transmitter coil 8 has, for example, a diameter of 22 mm. (X direction) and a length of 28 mm. (in the Y direction). Each rectangular coil segment is preferably coaxially aligned along the X axis for defining a coil axis at right angles to the direction of the polarizing magnetic $H_o$, Z axis. The transmitter coil 8 is used to apply A.C. magnetic field $H_1$ at frequencies corresponding to both the resonant frequency of the control nuclei and the resonant frequency of the nuclei to be analyzed. It is preferred that the coil be dimensioned for optimum performance at the analysis frequency since typically the signal strength of the nuclei to be analyzed is much less than the signal obtained from the control nuclei.

The transmitter coil 8 forms a coil structure common to both the control and analysis circuit channels of the spectrometer and, more particularly, common to both control and analysis channels of the dual channel transmitter circuitry 10. The dual channel transmitter circuitry, which includes the common transmitter coil 8, comprises a first low frequency tuned loop, L.F., formed by the series connection of the transmitter coil 8, high frequency trap 11, variable capacitor 12 and fixed capacitor 13, and a second, high frequency, tuned loop, H.F., formed by the series connection of the transmitter coil 8, inductor 17, variable capacitor 18, and fixed capacitor 19.

The low frequency tuned loop L.F. is series resonance tuned to the frequency of the nuclei under analysis by resonating the inductance of the coil 8 with the variable capacitor 12 as of 100–150 pf. The trap 11 comprises a parallel connection of inductor 14 as of 1 $\mu$h., and capacitor 15, as of 1.5 to 7 pf., resonated at the higher frequency corresponding to nuclear resonance of the control nuclei, typically $H^1$ or $F^{19}$ at 60 mHz. and 56 mHz, respectively. Fixed capacitor 13 as of 1000 pf. forms an A.C. voltage divider with capacitor 12 for impedance matching the low frequency loop L.F. to the output impedance, as of 1000Ω, of a low frequency transmitter, not shown, of the analysis channel connected at terminal 16 and ground.

The high frequency tuned loop H.F. is connected in shunt or parallel with the low frequency loop L.F. The high frequency loop H.F. is series resonant at the typically higher resonant frequency of the control nuclei as of $H^1$ or $F^{19}$ at 60 mHz. or 56 mHz., respectively, in a polarizing field $H_o$ of 14 kg. More particularly, the transmitter coil 8 which is optimized for performance at the low frequency analysis channel frequency may present a capacitive impedance due to the stray capacitance between adjacent turns of the coil 8 at the higher frequency of the control channel. This stray capacity is over balanced by series connected inductor 17 as of 1 $\mu$h. to present a net inductance at the resonant frequency of the control nuclei. This net inductance is then series resonated with variable capacitor 18, as of 1.5 to 7 pf., to form the series resonant loop H.F. Fixed capacitor 19, as of 50 pf., forms an A.C. voltage divider in loop H.F. for impedance matching the high frequency loop H.F. to the output impedance as of 100Ω of a high frequency control channel transmitter, not shown, connected to the high frequency loop via terminal 21 and ground.

Likewise the receiver coil 9 forms a coil structure common to both the control and analysis channels of the spectrometer and, more particularly, is common to both channels of the dual channel receiver circuitry 25.

The receiver coil 9 of the crossed coil system is conventional and comprises, for example, 10–20 turns of insulated wire wound coaxially upon and curving with the outside cylindrical surfaces of the innermost coil form, not shown. In a typical example the receiver coil 9 has a diameter of 12 mm. and a length of 12 mm. The receiver coil 9 defines an axis parallel to the Y axis and normal to both the direction of the polarizing magnetic field $H_o$ (Z axis) and to the axis of the transmitter coil 8 (X axis).

In the same manner as the transmitter circuitry 10, the receiver circuitry 25 includes two circuit loops, a high frequency control loop H.F. and a low frequency analysis loop L.F. with the receiver coil 9 common to both loops. The double tuned transmitter and receiver circuits are essentially identical except for different impedance matching considerations which will be described. The same reference numerals have been employed to identify equivalent circuit elements in both circuits.

In the high frequency receiver loop H.F. capacitor 19 is of for example 50 pf. for impedance matching the high frequency loop H.F. to the input impedance as of 1000Ω of the high frequency receiver, not shown, connected to the loop H.F. at receiver terminal 26 and ground. The low frequency receiver of the analysis channel, not shown, is connected to the low frequency analysis loop L.F. via terminal 27 and ground.

The input impedance as of 5000Ω of the low frequency receiver, not shown, is matched to the low frequency loop by being connected across the variable capacitor 12 as of 110 pf. without need of a separate impedance matching capacitor 13 as was used in the transmitter circuitry 10.

Referring now to FIGS. 2 and 3 there are shown alternative portions of the high frequency loop H.F. depicting alternative inductive methods for impedance matching into the high frequency loop H.F. In FIG. 2 the inductor 17 is tapped to the terminal 21 or 26 for impedance matching to the high frequency transmitter or receiver impedance. In FIG. 3 the inductor 17 is inductively coupled via a separate coupling loop 30 for impedance matching to the high frequency transmitter or receiver impedance. In both instances the impedance matching capacitor 19 has to be eliminated as it is no longer needed for that function.

Referring now to FIG. 4 there is shown a single coil probe embodiment of the present invention. In this embodiment a single coil 31, within the probe 1 and located in the same manner as the receiver coil 9 of FIG. 1, serves the dual function of radio frequency transmitter and receiver coil for both the analyzer and control channels of the spectrometer. The coil 31 forms a common element of a double tuned circuit 32 providing part of the analyzer and control channels. The double tuned circuit 32 has two tuned loops, a high frequency loop H.F. and a low frequency loop L.F. essentially identical to the circuitry 25 of FIG. 1 and the same reference numerals have been employed in both figures to identify the same circuit elements.

The two circuits 25 and 32 are essentially the same, differing only in impedance matching considerations and transmitter-receiver isolation within the same channel. More particularly, the high frequency loop H.F. has no separate impedance matching capacitor 19 for matching the high frequency receiver into the loop via terminal 26 and ground. However a capacitor 33 as of 5 pf. is provided between the transmitter input terminal 21 and the high frequency receiver terminal 26 for isolating the load of the transmitter from the input of the receiver. This result is accomplished when capacitor 33 is of such a value of capacitance as to present a high impedance compared to the parallel impedance of the tuned circuit loop H.F. at the frequency of the high frequency control channel. When this condition is satisfied resonance signals emanating from the tuned circuit including the coil 31 are decoupled from the transmitter relative to the receiver due to the relatively high impedance of the isolating capacitor 33. The same consideration applies to the low frequency loop L.F. where an isolating capacitor 34 presents a high impedance at the low frequency of the L.F. loop compared to the parallel impedance of the tuned low frequency loop L.F. circuit.

In the receiver circuit of FIG. 4, the receiver senses resonance of the nuclei by detecting a fluctuation in the impedance of the coil 31 with resonance of the nuclei. Therefore, the isolating capacitors 33 and 34 prevent resonance signals, emanating from the tuned coil 31, from being shunted around the receiver through the transmitter circuits.

In a typical example of a combined transmitter and receiver coil 31, for analyzing $C^{13}$ or $N^{15}$ at 15 mHz. and 6 mHz., respectively, while controlling resonance conditions using $F^{19}$ or $H^1$ nuclei at 56 mHz. or 60 mHz., the single coil 31 would have 6 turns of wire wound on a coil form 12 mm. in diameter with the axial length of the coil 31 being 12 mm.

In another embodiment of the present invention, shown partially in FIG. 4A, the low frequency analysis channel is a crossed coil system with the receiver coil 31 of this system also serving as the combined transmitter-receiver coil of a single coil control channel operating at a higher frequency than the analysis channel. In this system the receiver circuitry is a double tuned circuit 32 as previously described with regard to FIG. 4, except that the low frequency analysis transmitter channel portion, comprising terminal 16 and isolating capacitor 34, is eliminated. The low frequency analysis transmitter portion of the circuitry is replaced by a separate analysis channel transmitter coil 8 similar to that shown in FIG. 1. The analysis transmitter coil 8, as shown in FIG. 4A, is preferably wound coaxially of the X axis, as shown in FIG. 1, although it is also possible to wind the transmitter coil coaxially of the single combined transmitter and receiver coil 31. The transmitter coil 8 need not be part of a tuned circuit, although it would be preferred, and is connected to the low frequency analysis transmitter via terminal 16 and ground.

Referring now to FIG. 5 there is shown, in block diagram form, a nuclear magnetic resonance spectrometer system employing the features of the present invention as previously described in FIGS. 1 and 4. More particularly, the probe 1 is immersed in a polarizing magnetic field $H_o$ as of 14 kg. produced by a magnet. A first low frequency transmitter 36 is connected to the transmitter coil 8 of the crossed coil system or coil 31 of the single coil system via terminal 16 or 16' and supplies low frequency R.F. power to coils 8 or 31 within the probe at a frequency to excite nuclear magnetic resonance of the nuclei of the sample under analysis. For analysis of $N^{15}$ nuclei at a polarizing field intensity of 14 kg. the frequency of the low frequency transmitter 36 is approximately 6 mHz. For analysis of $C^{13}$ nuclei the transmitter frequency is 15 mHz. at 14 kg.

The nuclear resonance signal of the nuclei under observation is received in receiver coil 9 or coil 31 and fed via terminal 27 to an R.F. amplifier 37 and thence to a phase detector 38 wherein the phase of the received signal is compared with the phase of the transmitted signal derived from transmitter 36 via lead 40 to obtain a D.C. output resonance signal. The output signal is fed to and recorded as a function of time or sweep frequency in recorder 39 to produce a recorded spectrum of the sample nuclei under analysis.

The reference or control channel includes a second or high frequency transmitter 41 which supplies R.F. power, at the resonance frequency of the control nuclei, such as $H^1$ or $F^{19}$, to the common transmitter coil 8 or 31 via terminal 21. The applied high frequency control signal for $H^1$ nuclei at 14 kg. polarizing field is about 60 mHz. and produces resonance of the $H^1$ nuclei forming the internal reference or control nuclei. Resonance of the control nuclei appears as a signal obtained from the receiver coil 9 or 31 and which is manifested as a change in impedance of the coil which is reflected into the input of an R.F. receiver 44 connected to the single coil 9 or 31 via terminal 26. The output signal of the receiver 44 is fed to a phase sensitive detector 45 where the received signal is compared to a signal derived from the second transmitter 41 via lead 46 to produce a phase sensitive D.C. resonance dispersion signal of the control group, i.e., resonance error or control signal. The control signal is fed to a controller 47, i.e. power amplifier, for controlling either/or both the polarizing magnetic field intensity $H_o$ or the frequency of both the high frequency and low frequency applied R.F. exciting magnetic fields $H_1$ to maintain predetermined controlled ratios of frequency of $H_1$ to polarizing field intensity $H_o$ corresponding to sustained resonance of the control group.

In case the polarizing field intensity $H_o$ is being controlled the controller output signal is fed via lead 48 to a winding 49 on the magnet or to the magnet power supply, not shown. In case the frequency is being controlled the output control signal is fed to a frequency synthesizer 51 which serves as a common frequency source for both the analysis and control transmitters 36 and 41 via leads 52 and 53 to control both their frequencies in a like ratio.

A sweep generator 54 supplies a sweep signal to the frequency synthesizer 51 for sweeping only the frequency of the analysis transmitter 36 through a frequency range to cover the expected spectrum of the sample under analysis. A sample of the sweep signal or of an output proportional to the sweep signal is advantageously applied to the recorder 39 via lead 55 to obtain a recorded spectrum of the sample nuclei under analysis as a function of the sweep frequency.

Although the spectrometer system of FIG. 5 has been described using a frequency sweep obtained from the frequency synthesizer 51 to sweep through the spectrum of the sample under analysis, this is not a requirement. Other sweep methods are equally applicable. For instance, a variable frequency field modulation at a suitable sideband frequency as of 2 to 20 kHz. may be employed to advantage in certain spectrometer systems.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a nuclear magnetic resonance spectrometer, means forming a control channel for controlling the resonance conditions of the spectrometer by exciting and detecting nuclear resonance of a control group of nuclei of a first kind at a first frequency, means forming an analysis channel for observing the resonance spectrum of a sample group of nuclei of a second kind at a second frequency, coil means common to both of said control and analysis channels for coupling A.C. magnetic fields at said first and second frequencies to a common region of space containing both groups of nuclei for exciting and receiving magnetic resonance thereof, said common coil means forming part of a double tuned circuit means tuned to the two resonance frequencies corresponding to the different resonance frequencies of the two different kinds of nuclei, whereby the sensitivity of the spectrometer is enhanced, said double tuned circuit which includes said common coil means including an analysis circuit loop portion which includes said common coil, said analysis loop being tuned to the nuclear resonant frequency of the sample under analysis, means forming a circuit branch connected in shunt across said analysis circuit loop to define a control tuned circuit loop including said common coil means, said control circuit loop being tuned to the resonant frequency of the control group which frequency is higher than the resonant frequency of said analysis circuit loop, and said analysis tuned circuit loop including a tuned trap external of said control circuit loop portion, said trap being tuned to the frequency of said tuned control loop for presenting a high impedance to radio frequency energy in said control loop for separating said composite double tuned circuit into the separate control and analysis channels.

2. The apparatus according to claim 1, wherein said coil means is a crossed coil system of coils having a transmitter coil and a separate receiver coil each being common to a separate one of said double tuned circuit means.

3. The apparatus according to claim 1, wherein said coil means is a single coil means for both exciting and detecting magnetic resonance of both groups of nuclei.

4. The apparatus according to claim 1, wherein said tuned analysis circuit loop is tuned to the resonant frequency of nuclei of atoms selected from the class of $C^{13}$ and $N^{15}$ and said control loop is tuned to a resonant frequency corresponding to the nuclei of atoms selected from the class of $F^{19}$ and $H^1$.

5. The apparatus according to claim 1, wherein said common coil means is a single coil means for both exciting and detecting magnetic resonance of the control group of nuclei, and wherein said single coil means is also a receiver coil means of a crossed coil system of said analysis channel for exciting and detecting magnetic resonance of the sample nuclei under analysis.

References Cited

UNITED STATES PATENTS

| | | | |
|---|---|---|---|
| 3,085,195 | 4/1963 | Anderson | 324—.5 |
| 3,109,138 | 10/1963 | Varian | 324—.5 |
| 3,329,890 | 7/1967 | Kingston | 324—.5 |

RUDOLPH V. ROLINEC, *Primary Examiner.*

MICHAEL J. LYNCH, *Assistant Examiner.*